(12) United States Patent
Rustwick

(10) Patent No.: US 10,940,805 B2
(45) Date of Patent: Mar. 9, 2021

(54) VEHICLE HOOKS

(71) Applicant: Dee Zee, Inc., Des Moines, IA (US)

(72) Inventor: Bryce Rustwick, Clive, IA (US)

(73) Assignee: DEE ZEE, INC., Des Moines, IA (US)

( * ) Notice: Subject to any disclaimer, the term of this patent is extended or adjusted under 35 U.S.C. 154(b) by 0 days.

(21) Appl. No.: 16/279,573

(22) Filed: Feb. 19, 2019

(65) Prior Publication Data

US 2019/0256008 A1 Aug. 22, 2019

Related U.S. Application Data

(60) Provisional application No. 62/632,515, filed on Feb. 20, 2018.

(51) Int. Cl.
| | | |
|---|---|---|
| *B60R 9/06* | (2006.01) | |
| *B62D 33/02* | (2006.01) | |
| *B60R 7/10* | (2006.01) | |

(52) U.S. Cl.
CPC ............... *B60R 9/06* (2013.01); *B60R 7/10* (2013.01); *B62D 33/0207* (2013.01)

(58) Field of Classification Search
CPC .. B60R 7/10; B60R 9/06; B60R 7/043; B60R 7/08; B60R 5/04; B62D 33/0207; B60P 7/15; B60P 7/135; B60P 7/0807; B60P 7/0815; F16B 45/02; F16B 45/06
USPC ..... 224/403; 24/538–541, 599.1–600.1, 376; 248/691, 567, 183.2, 308, 341, 340, 248/289.11
See application file for complete search history.

(56) References Cited

U.S. PATENT DOCUMENTS

| | | | | |
|---|---|---|---|---|
| 1,151,246 A | * | 8/1915 | Criswell | F16G 15/02 59/88 |
| 4,696,405 A | * | 9/1987 | Waring | F41A 23/18 16/360 |
| 5,524,772 A | * | 6/1996 | Simmons | A47B 81/005 211/4 |
| 5,533,848 A | * | 7/1996 | Davis | B60P 7/0815 410/104 |
| 8,708,290 B2 | * | 4/2014 | Franta | B65H 57/06 248/68.1 |
| 2011/0095156 A1 | | 4/2011 | Myers et al. | |

FOREIGN PATENT DOCUMENTS

| | | | | |
|---|---|---|---|---|
| DE | 202016100633 U1 | 6/2016 | | |
| EP | 1645471 A1 | 4/2006 | | |
| EP | 1724156 A1 | * | 11/2006 | ............... B60R 7/08 |
| EP | 1724156 A1 | 11/2006 | | |
| FR | 2897029 A3 | 8/2007 | | |

OTHER PUBLICATIONS

International Search Report & Written Opinion pertaining to Application No. PCT/US2019/018575 filed Feb. 19, 2019.

* cited by examiner

*Primary Examiner* — Nathan J Newhouse
*Assistant Examiner* — Matthew T Theis
(74) *Attorney, Agent, or Firm* — Dinsmore & Shohl LLP

(57) ABSTRACT

In some embodiments, a vehicle hook includes a base configured to be coupled to a support structure of a vehicle and a rotatable hook rotatively coupled to the base having an open position and a closed position. The rotatable hook includes a hook arm having an end, wherein the end of the hook arm is vertically aligned with the base when the rotatable hook is rotated to the closed position and the end of the hook arm is angularly spaced from the base when the rotatable hook is rotated to the open position.

20 Claims, 10 Drawing Sheets

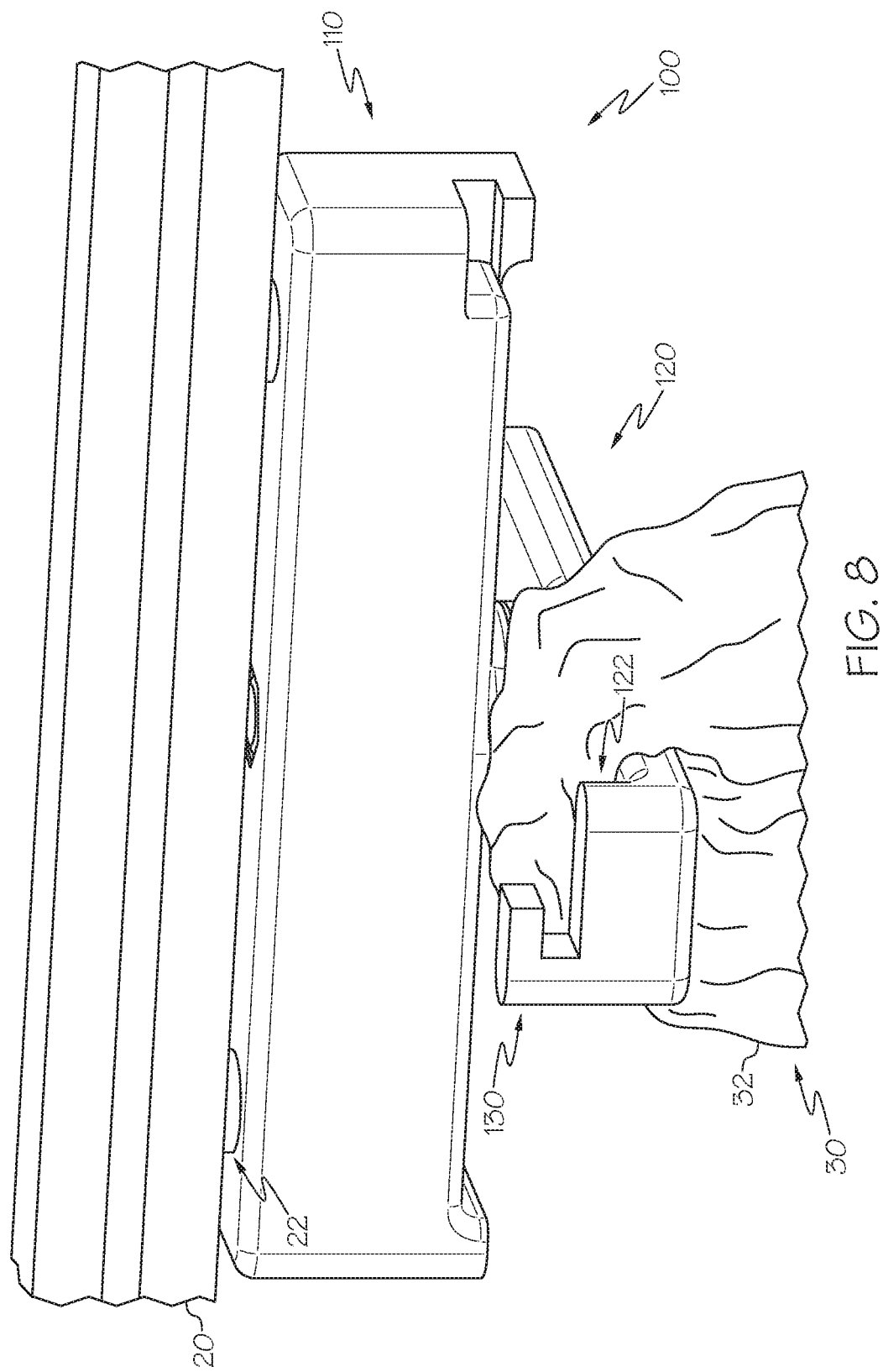

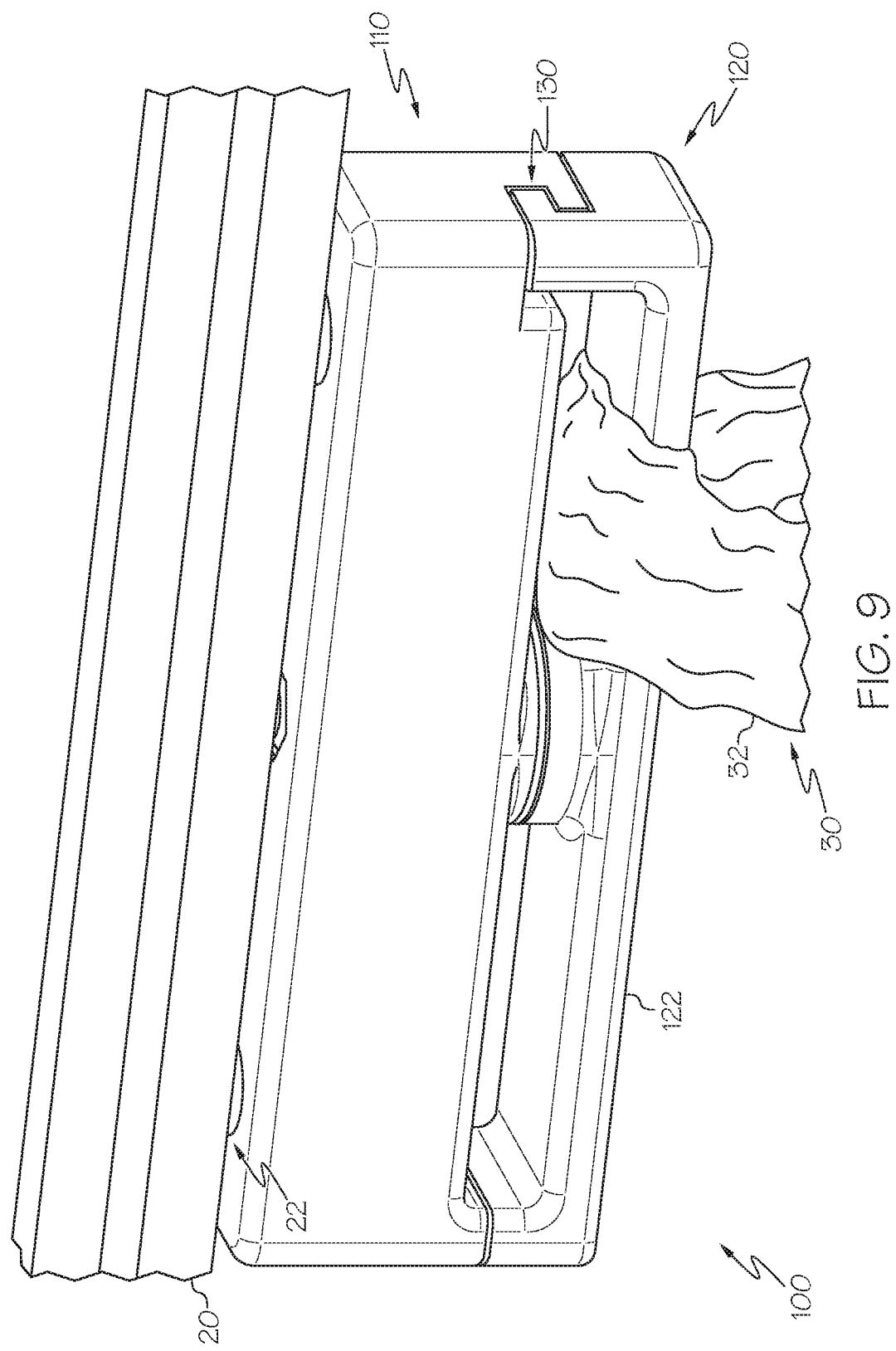

VEHICLE HOOKS

CROSS-REFERENCE TO RELATED APPLICATION

This application claims the benefit of U.S. Provisional Patent Application No. 62/632,515, filed Feb. 20, 2018, hereby incorporated by referenced in its entirety.

TECHNICAL FIELD

The present specification generally relates to a vehicle hook a vehicle and, more specifically, to a robust vehicle hook for supporting a weight in a trunk or bed of a vehicle.

BACKGROUND

Vehicle hooks are hooks that are mountable within a vehicle for example the trunk or bed of the vehicle and may help restrain objects therein. For example, these hooks may help retain grocery bags or other types of bags having a strap. Such vehicle hooks help prevent bags from moving and/or spilling while the vehicle is in motion. However, current vehicle hooks are typically unable to support heavier loads and are thus limited in their ability to restrain objects.

Accordingly, a need exists for alternative vehicle hooks capable of securing items within a storage space (e.g., a trunk or bed) of a vehicle.

SUMMARY

In one embodiment, a vehicle hook includes a base configured to be coupled to a support structure of a vehicle and a rotatable hook rotatively coupled to the base having an open position and a closed position. The rotatable hook includes a hook arm having an end, wherein the end of the hook arm is vertically aligned with the base when the rotatable hook is rotated to the closed position and the end of the hook arm is angularly spaced from the base when the rotatable hook is rotated to the open position.

In another embodiment, a vehicle hook kit includes a base configured to be coupled to a support structure within a trunk of a vehicle and a rotatable hook configured to be rotatively coupled to the base and having an open position and a closed position. The rotatable hook includes a hook arm and an interlock projection that extends from the hook arm. The interlock projection is configured to form an interlock with the base when the rotatable hook is rotated to the closed position and the interlock projection is configured to be angularly spaced from the base when the rotatable hook is rotated to the open position.

In yet another embodiment, a vehicle includes a trunk having a support structure and a vehicle hook. The vehicle hook includes a base coupled to the support structure within a trunk of a vehicle and a rotatable hook rotatively coupled to the base having an open position and a closed position. The rotatable hook includes a hook arm and an interlock projection extending from the hook arm, wherein the interlock projection forms an interlock with the base when the rotatable hook is rotated to the closed position and the interlock projection is angularly spaced from the base when the rotatable hook is rotated to the open position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8 depicts the vehicle hook of FIG. 7 rotated to an open position and supporting an object thereon, according to one or more embodiments shown and described herein; and FIG. 9 depicts the vehicle hook of FIG. 8 rotated to a closed position, according to one or more embodiments shown and described herein.

DETAILED DESCRIPTION

Embodiments described herein are directed to vehicle hooks that are configured top support an objects to prevent the objects from sliding around or spilling within a storage space (e.g., trunk or bed of a vehicle. In embodiments, a vehicle hook includes a base configured to be coupled to a support structure within a trunk of a vehicle and a rotatable hook rotatively coupled to the base having an open position and a closed position. The rotatable hook includes a hook arm having an end, wherein the end of the hook arm is vertically aligned with the base when the rotatable hook is rotated to the closed position and the end of the hook arm is angularly spaced from the base when the rotatable hook is rotated to the open position. In some embodiments, the hook arm includes an interlock projection extending from the hook arm, wherein the interlock projection forms an interlock with the base when the rotatable hook is rotated to the closed position and the interlock projection is angularly spaced from the base when the rotatable hook is rotated to the open position. As will be described in greater detail herein, when in the open position a bag or other object with a strap may be placed onto the hook arm. The rotatable hook can then be rotated to the closed position. In embodiments including an interlock between the interlock projection and the base, the base aids the hook arm in supporting the load of the object. Such shared loading capacity may increase the load supportable on the vehicle hook as compared with a conventional vehicle hook lacking this interlocking configuration.

As used herein, a "trunk" of a vehicle may refer to a main storage compartment enclosed within or otherwise defined by the body of the vehicle that is used or can be used for transporting objects with the vehicle. For example, the trunk can be a typical trunk located at either a front or rear of the vehicle and accessible from the outside of the vehicle by a door. The trunk may also refer to an open truck bed. Furthermore, unless otherwise noted, the term "trunk" may be used interchangeably with the term "storage space." Though the vehicle hook is described as being mounted within a storage space of a vehicle, it is contemplated and possible that the vehicle hook may be mounted anywhere within the vehicle, including a passenger cabin of the vehicle.

As used herein, the term "longitudinal direction" refers to the +/−X direction depicted in the figures. The term "lateral direction" refers to the +/−Y direction depicted in figures, which is perpendicular to the longitudinal direction. The term "vertical direction" refers to the +/−Z direction depicted in the figures, which is perpendicular to both the longitudinal direction and the lateral direction.

Figure 1A:
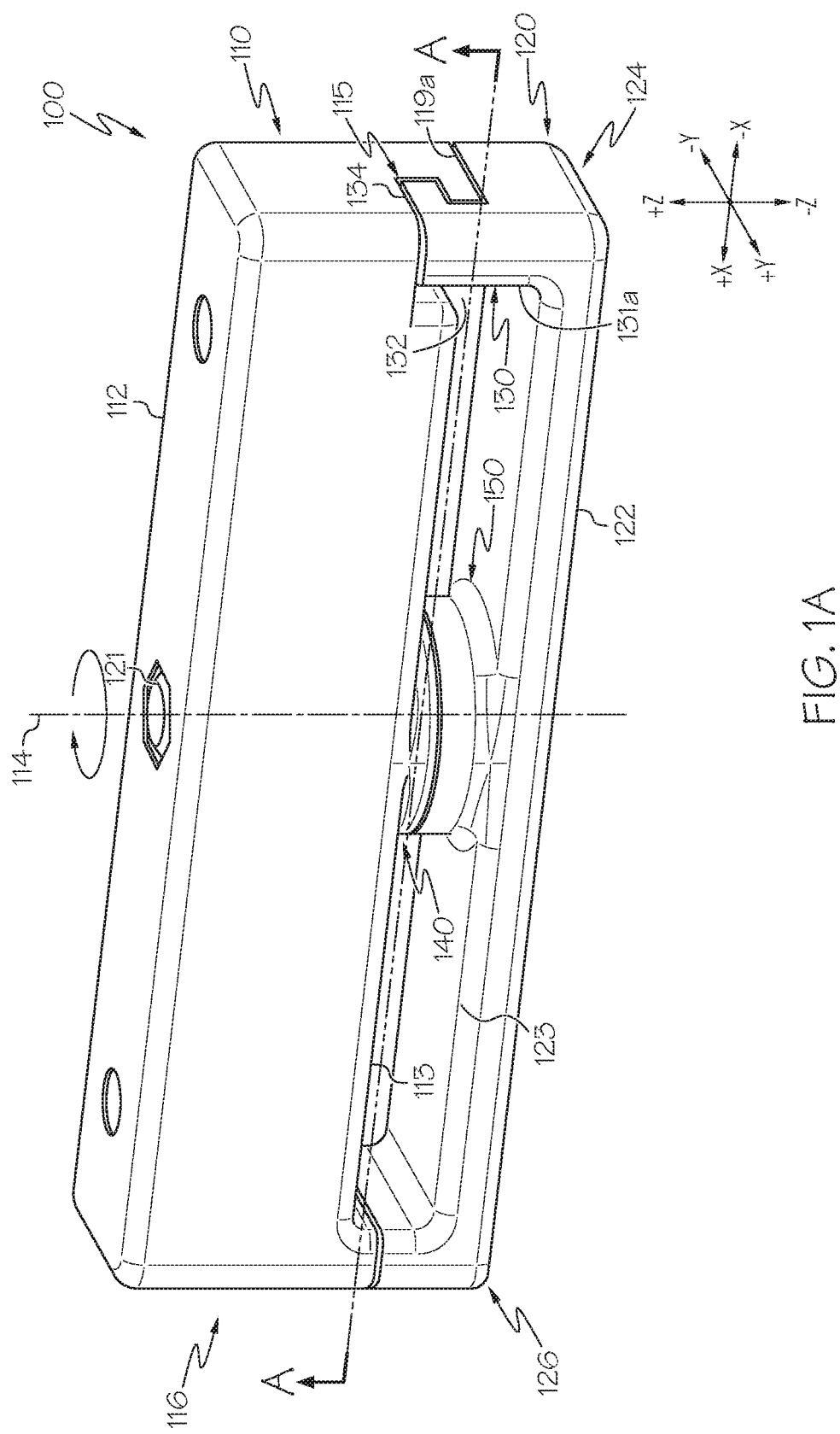
FIG. 1A depicts a perspective view of a vehicle hook, according to one or more embodiments shown and described herein.
Figure 1B:
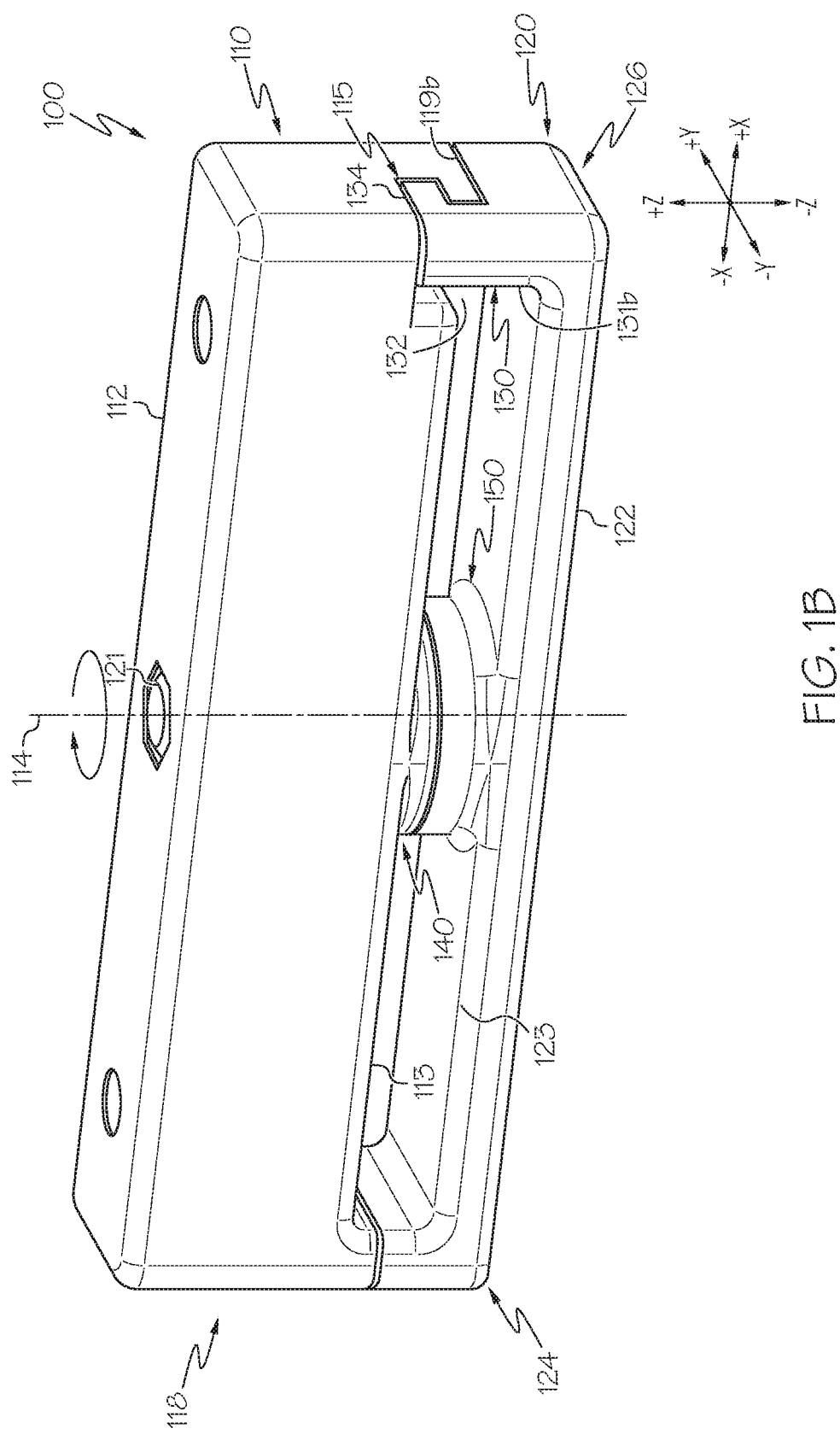
FIG. 1B depicts another perspective view of the vehicle hook of FIG. 1A, according to one or more embodiments shown and described herein.

FIGS. 1A and 1B illustrate a front view of a vehicle hook 100 and a rear view of the vehicle hook 100 respectively in a closed position. As shown the vehicle hook 100 includes a base 110 and a rotatable hook 120 rotatively coupled to the base 110. In some embodiments, the vehicle hook 100 can be provided to an installer as a kit and may include the base 110, the rotatable hook 120, and an installation kit (not shown) having tools and/or hardware for installing the vehicle hook 100 to a support structure within a trunk of a vehicle 10. In the kit, the rotatable hook 120 may already be rotatively coupled to the base 110 or provided as a separate component assemblable to the base 110.

The base 110 may define a mounting surface 112 for mounting the base 110 to a support structure (e.g., support structure 20 illustrated in FIGS. 7-8) within a storage space of a vehicle 10. Accordingly, the mounting surface 112 may include apertures extending therethrough for mounting the base 110 to a support structure within a vehicle with, for example, threaded fasteners. In other embodiments, the mounting surface 112 may be, for example, adhesively or magnetically coupled to the support structure 20 within the vehicle 10. Other conventional coupling techniques are contemplated and possible.

Still referring to FIGS. 1A and 1B and as noted above, the rotatable hook 120 is rotatively coupled to the base 110. The base 110 may accordingly define the axis of rotation 114 of the rotatable hook 120. In the depicted embodiment, the axis of rotation 114 is perpendicular to the mounting surface 112. However, other orientations of the axis of rotation 114 relative to the mounting surface 112 are contemplated and possible. In some embodiments, to rotatively couple the base 110 to the rotatable hook 120, a pin 121 (e.g., a bolt) may be passed through the base 110 along the axis of rotation 114 and secured such that the rotatable hook 120 is rotatable relative to the base 110.

Figure 2:
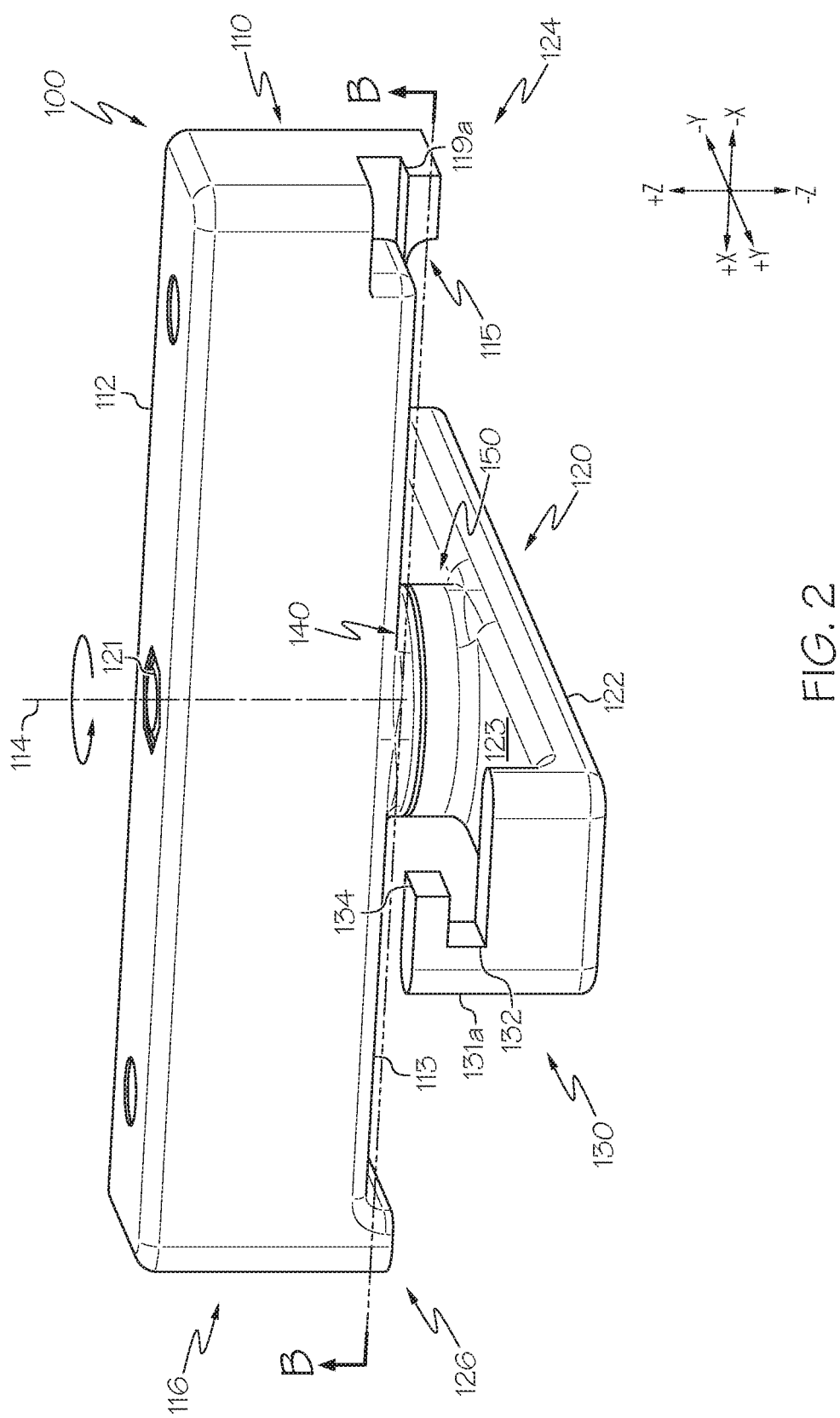
FIG. 2 depicts a perspective view of the vehicle hook of FIG. 1A rotated to an open position, according to one or more embodiments shown and described herein.

The rotatable hook 120 includes a hook arm 122 illustrated as extending along the longitudinal direction to an end of the hook arm. When in the closed position, the end of the hook arm 122 may be vertically aligned with the base along the vertical direction. In some embodiments, an interlock projection 130 extends from the hook arm 122 toward the base 110. For example the interlock projection 130 is illustrated as extending perpendicularly from the hook arm 122 at an end of the hook arm 122. However, it is contemplated that the interlock projection 130 may extend from the hook arm 122 at a location other than the end of the hook arm 122. The interlock projection 130 may include an extending portion 132 and a locking tab 134 projecting laterally from the extending portion 132, as illustrated. When in the closed position, as shown in FIGS. 1A and 1B, the locking tab 134 extends into a port 115 of the base 110. The port 115 is a recess that is sized and arranged to receive the locking tab 134. Friction between the locking tab 134 and the surfaces of the port 115 may inhibit the rotatable hook 120 rotation of the hook arm 122 away from the closed position until caused to move by a user toward an open position, such as shown in FIG. 2. By providing the interlock projection 130 as extending from the hook arm 122 toward the base 110, at least a portion of the hook arm 122 may be spaced vertically from the base 110 thereby defining a gap between the hook arm 122 and the base 110 with the hook arm 122 in the closed position.

Still referring to FIGS. 1A and 1B, in the illustrated embodiment, the hook arm 122 includes a first end 124 from which a first interlock projection 131a extends and a second end 126 from which a second interlock projection 131b extends. In such embodiments, the rotatable hook 120 may be rotatively coupled to the base 110 between the first end 124 and the second end 126 of the hook arm 122. For example, the rotatable hook 120 may be rotatively coupled to the base 110 at a midpoint along the hook arm 122 between the first end 124 and the second end 126. In such embodiment, the first interlock projection 131a forms an interlock with the base 110 on a first side 116 of the base 110 and the second interlock projection 131b forms an interlock with the base 110 on a second side 118 of the base 110 opposite the first side 116.

When in the closed position, such as illustrated in FIGS. 1A and 1B, a portion (e.g., portion 119a and/or portion 119b) of the base 110 extends from a bottom surface 113 of the base 110 between the hook arm 122 and the interlock projection 130 in the vertical direction. For example, portion 119a of the base 110 may extend between and contact the locking tab 134 of the first interlock projection 131a and the first end 124 of the hook arm 122 and portion 119b of the base 110 may extend between and contact the locking tab 134 of the second interlock projection 131b and the second end 126 of the hook arm 122. Accordingly, when a load is supported on the hook arm 122, a portion of the load is also supported by the portion (e.g. portion 119a and/or portion 119b) of the base 110.

FIG. 2 illustrates the rotatable hook 120 rotated to an open position. As illustrated the end of the rotatable hook 120 may be angularly spaced from the base 110 when the rotatable hook is rotated to the open position. In embodiments including an interlock projection, the interlock projection 130 is angularly offset from the portions 119a and 119b and angularly spaced from the base 110 when the rotatable hook 120 is rotated to the open position. This allows for an object such as a bag having straps to be hooked on to either side of the hook arm 122. In some embodiments, the rotatable hook 120 may be rotated clockwise in the X/Y plane about the axis 114 to a position wherein the hook arm 122 is positioned about 90 degrees relative to the base 110. Stated another way, the rotatable hook 120 may rotate to a position wherein the hook arm 122 is perpendicular to the base 110 in the X/Y plane. In other embodiments, the hook arm 122 may be able to be rotated a greater or lesser amount.

In some embodiments, the rotatable hook 120 may be rotatable a full 360 degrees relative to the base 110 and be freely rotatable to any angular position relative to the base. In other embodiments, the rotatable hook 120 may be rotatable a predetermined amount, such as 90 degrees to the position of FIG. 2. In some embodiments, the rotatable hook 120 may lock in a particular angular position to inhibit rotation of the rotatable hook 120 relative to the base 110. In some embodiments, the rotatable hook 120 may include multiple locking positions located at predetermined positions relative to the base 110.

Figure 3:
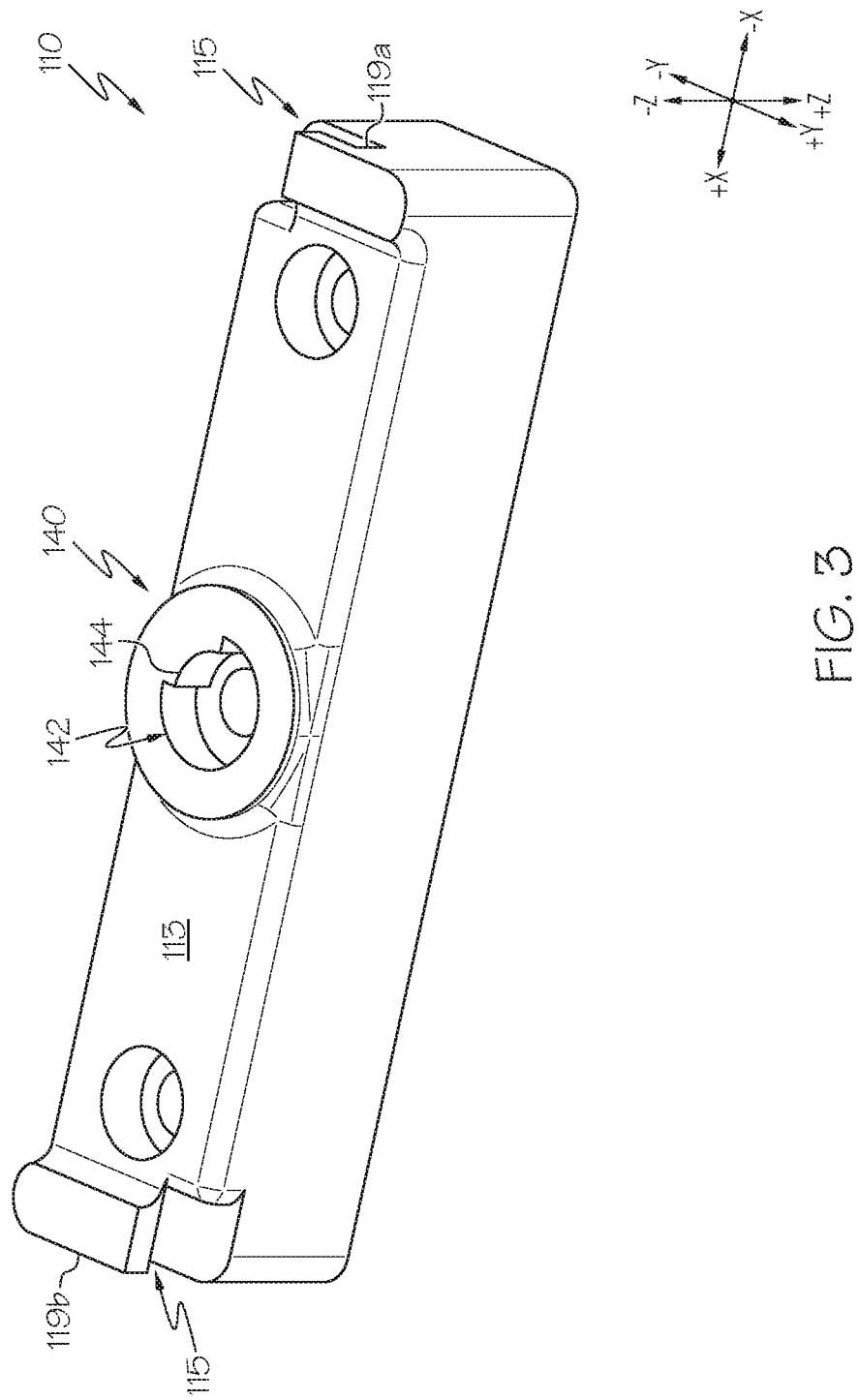
FIG. 3 depicts a base of the vehicle hook of FIG. 1A in isolation, according to one or more embodiments shown and described herein.

FIG. 3 illustrates a bottom perspective view of the base 110 in isolation. A base connector 140 for connecting the base 110 to the rotatable hook 120 is illustrated. The base connector 140 is illustrated as protruding from a bottom surface 113 of the base 110. However, it is contemplated that the base connector 140 may be level with the bottom surface 113 of the base 110. The base connector 140 defines a receiving aperture 142 extending into the base 110. The receiving aperture 142 may have a base stop 144 formed within. As will be described in greater detail, the base stop 144 may provide a limit to a degree of rotation that the rotatable hook 120 may travel through.

Figure 4:
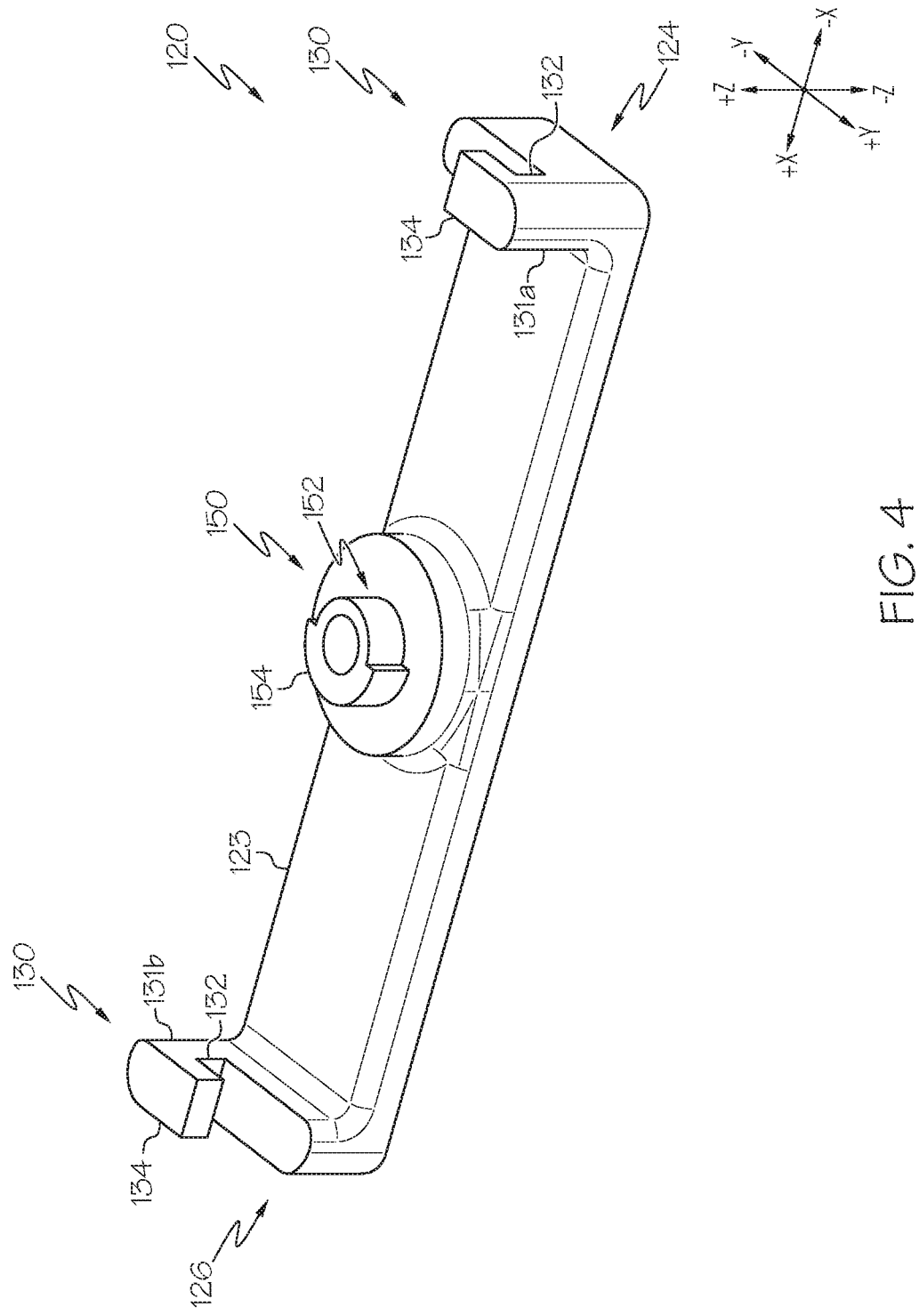
FIG. 4 depicts a rotatable hook of the vehicle hook of FIG. 1A in isolation, according to one or more embodiments shown and described herein.

FIG. 4 illustrates a perspective view of the rotatable hook 120 in isolation. The rotatable hook 120 may include a hook connector 150 that extends from an upper surface 123 of the hook arm 122. The hook connector 150 may include a mating structure 152 configured to be received within the receiving aperture 142 of the base connector 140. The mating structure 152 may include a rotation stop 154. The rotation stop 154 of the hook connector 150 and the base stop 144 of the base connector 140 may limit the degree of rotation 114 of the rotatable hook 120.

Figure 5:
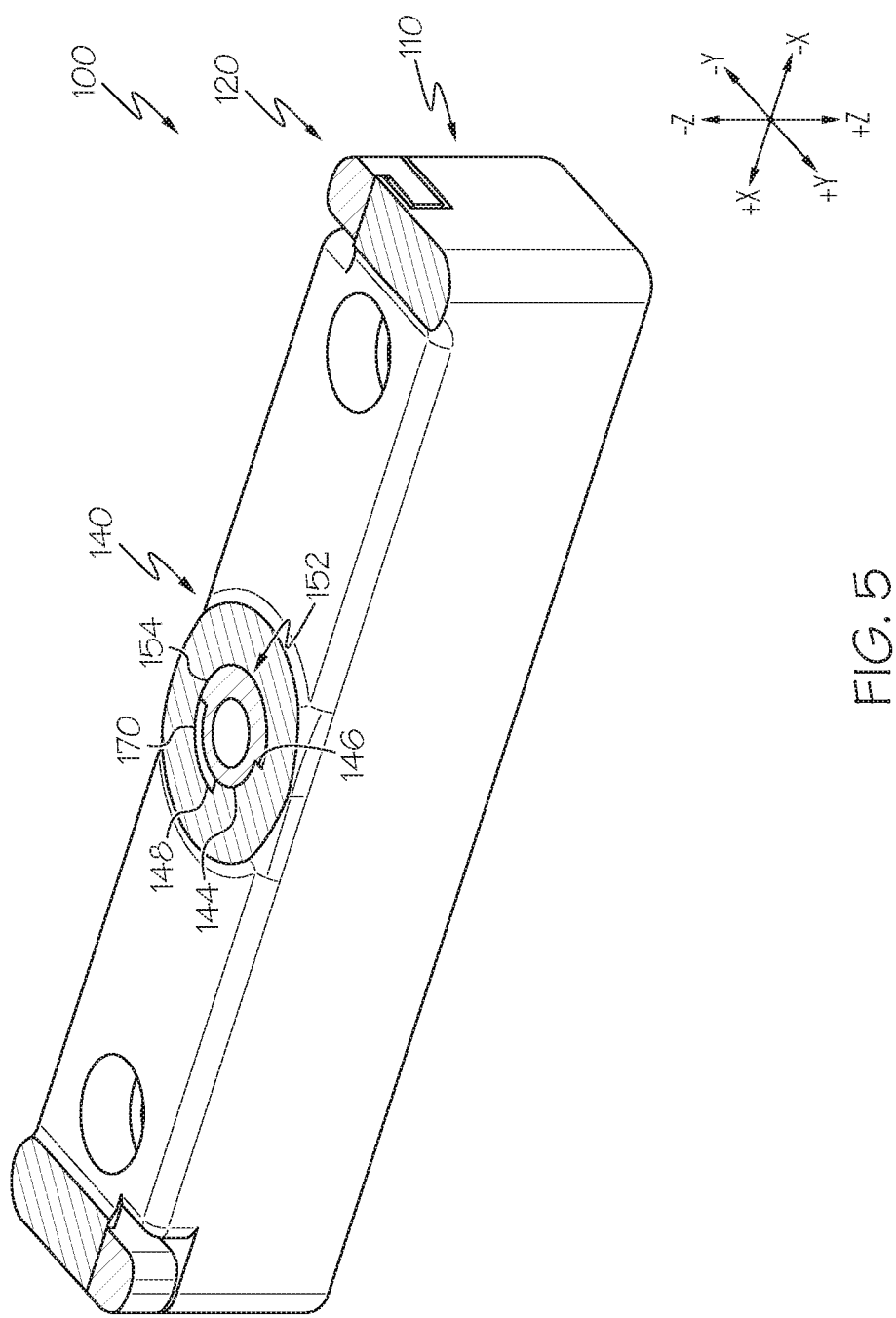
FIG. 5 depicts a perspective view of a cross-section A-A taken in FIG. 1A, according to one or more embodiments shown and described herein.
Figure 6:
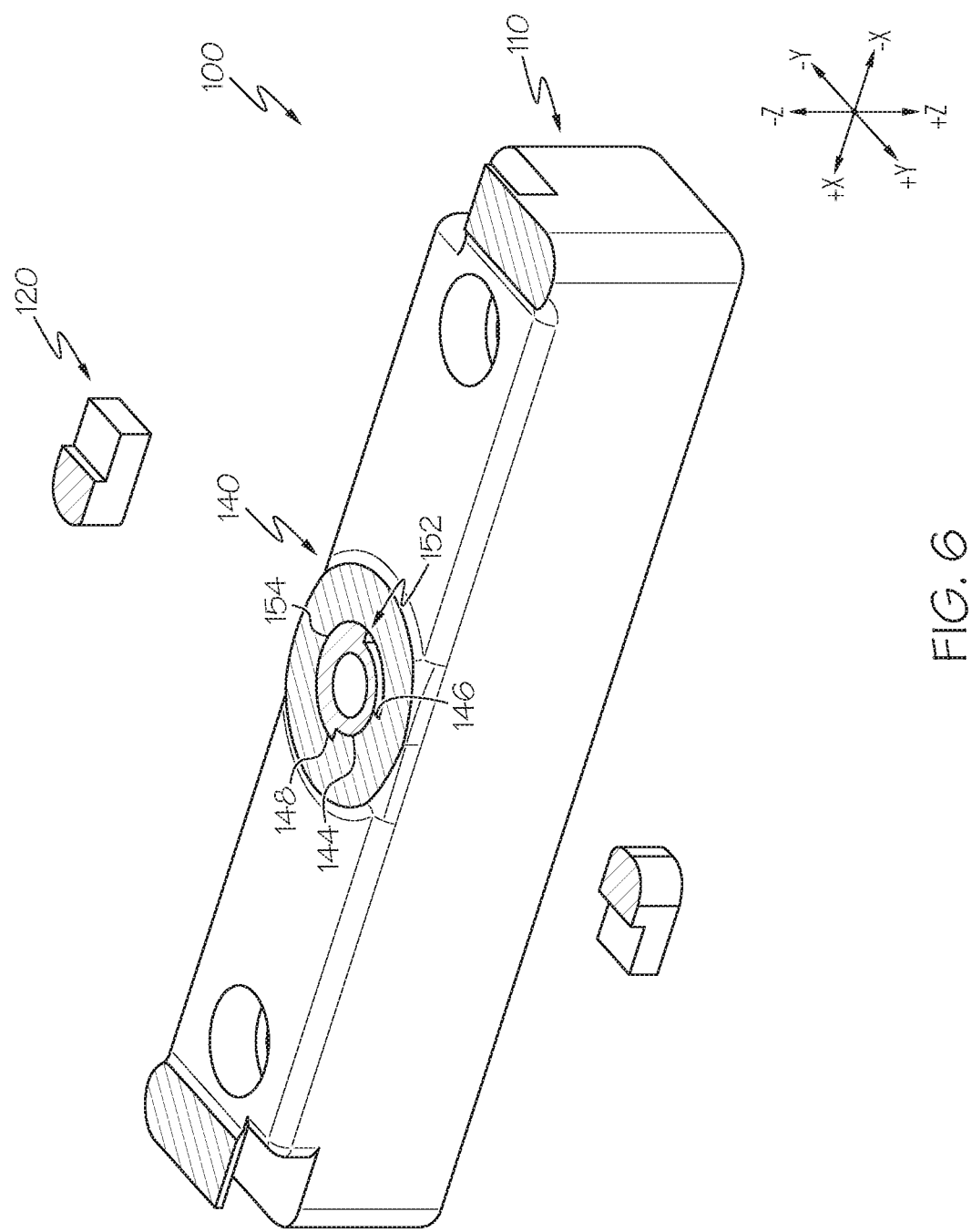
FIG. 6 depicts a perspective view of a cross-section B-B taken in FIG. 2, according to one or more embodiments shown and described herein.

For example, FIG. 5 illustrates a cross-section of the vehicle hook 100 taken along line A-A in FIG. 1A. Accordingly, the rotation stop 154 of the rotatable hook 120 is illustrated in the closed position, wherein the rotation stop 154 contacts a first wall 146 of the base stop 144. As shown an open space 170 is positioned between a second wall 148 of the base stop 144 and the rotation stop 154. FIG. 6 illustrates a cross-section of the vehicle hook 100 taken along line B-B in FIG. 2. Accordingly, when the rotatable hook 120 is rotated to the open configuration the rotation stop 154 can be rotated through the open space 170 (shown in FIG. 5) until the rotation stop 154 contacts the second wall 148 of the base stop 144. Accordingly, rotation 114 of the rotatable hook 120 is limited by the interaction between the base stop 144 and the rotation stop 154.

Figure 7:
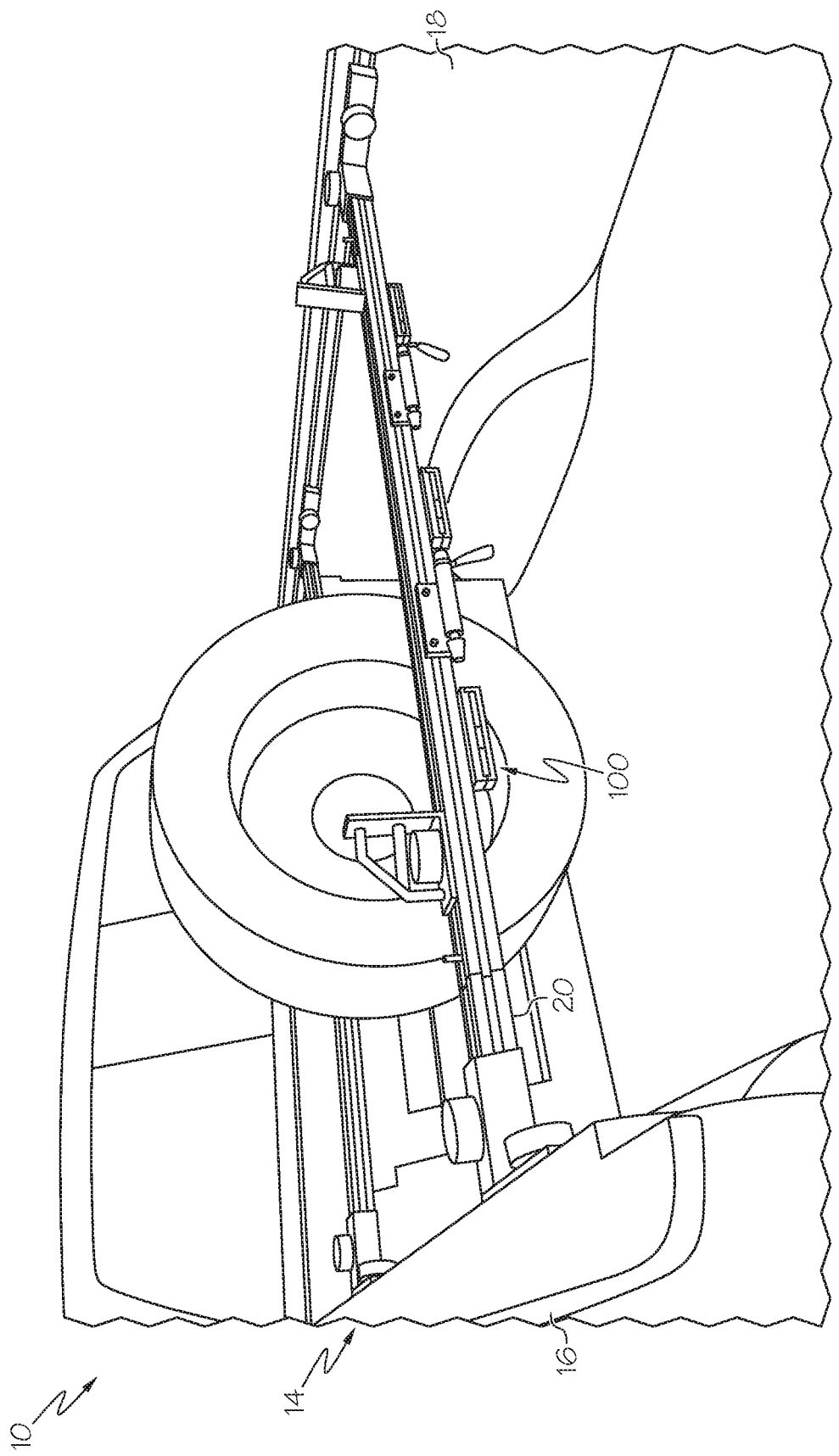
FIG. 7 depicts a truck having a truck bed with a vehicle hook mounted therein, according to one or more embodiments shown and described herein.

FIG. 7 illustrates a vehicle 10 (e.g., a truck) that includes a trunk (e.g., a truck bed 14) having side walls 16, 18. Extending between the side walls 16 is a support structure 20 to which a vehicle hook 100 is mounted. It is noted that in other embodiments or vehicles, the support structure 20 may be a wall of the trunk. In some embodiments, there may be multiple vehicle hooks mounted to the support structure 20. Furthermore, and as noted above, the vehicle hook 100 may be mounted to a support structure within a cabin of the vehicle 10.

FIG. 8 illustrates a view of the vehicle hook 100 mounted to the support structure 20 with one or more fasteners 22 (e.g., one or more bolts, pins, or the like), wherein the rotatable hook 120 is rotated to the open position. An object 30 (e.g., shopping bag, gym bag, backpack, etc.) having a handle or strap 32 is draped over the hook arm 122 of the rotatable hook 120 by the handle or strap 32. Once the handle or strap 32 is draped over the hook arm 122, the rotatable hook 120 may be rotated to the closed position as illustrated in FIG. 9. As noted above, the hook arm 122 is spaced from the base 110 when the rotatable hook 120 is rotated to the closed position. This leaves room for the handle or strap 32 to remain supported on the hook arm 122 when the rotatable hook 120 is rotated to the closed position. When in the closed position the interlock projection 130 is engaged with the base 110. This allows for greater weights to be supported by the rotatable hook 120 as opposed to a vehicle hook 100 without this engagement. That is, the object 30 is supported by both the rotatable hook 120 and the base 110.

Embodiments can be described with reference to the following numbered clauses, with preferred features laid out in the dependent clauses:

1. A vehicle hook comprising: a base configured to be coupled to a support structure of a vehicle; and a rotatable hook rotatively coupled to the base having an open position and a closed position, the rotatable hook comprising: a hook arm; and an interlock projection extending from the hook arm, wherein the interlock projection forms an interlock with the base when the rotatable hook is rotated to the closed position and the interlock projection is angularly spaced from the base when the rotatable hook is rotated to the open position.

2. The vehicle hook of clause 1, wherein: the base defines a mounting surface for mounting the base to the support structure of the vehicle; and the base defines an axis of rotation of the rotatable hook that is perpendicular to the mounting surface.

3. The vehicle hook of any preceding clause, wherein the hook arm is spaced from the base when the rotatable hook is rotated to the closed position.

4. The vehicle hook of any preceding clause, wherein the hook arm comprises a first end from which a first interlock projection extends and a second end from which a second interlock projection extends.

5. The vehicle hook of clause 4, wherein the rotatable hook is rotatively coupled to the base between the first end and the second end of the hook arm.

6. The vehicle hook of clause 4 or 5, wherein the first interlock projection forms the interlock with the base on a first side of the base and the second interlock projection forms the interlock with the base on a second side of the base opposite the first side.

7. The vehicle hook of any preceding clause, wherein a portion of the base extends between the hook arm and the interlock projection when the rotatable hook is rotated to the closed position.

8. A vehicle hook kit comprising: a vehicle hook and an installation kid for installing the vehicle hook to a support structure of a vehicle, the vehicle hook comprising: a base configured to be coupled to a support structure of a vehicle; a rotatable hook configured to be rotatively coupled to the base and having an open position and a closed position, the rotatable hook comprising: a hook arm; and an interlock projection extending from the hook arm, wherein the interlock projection is configured to form an interlock with the base when the rotatable hook is rotated to the closed position and the interlock projection is configured to be angularly spaced from the base when the rotatable hook is rotated to the open position.

9. The vehicle hook kit of clause 8, wherein: the base defines a mounting surface for mounting the base to the support structure of the vehicle; and the base defines an axis of rotation of the rotatable hook when the rotatable hook is rotatively mounted to the base that is perpendicular to the mounting surface.

10. The vehicle hook kit of clause 8 or 9, wherein the hook arm is configured to be spaced from the base when the rotatable hook is rotated to the closed position.

11. The vehicle hook kit of any of clauses 8-10, wherein the hook arm comprises a first end from which a first interlock projection extends and a second end from which a second interlock projection extends.

12. The vehicle hook kit of clause 11, wherein the rotatable hook is configured to be rotatively coupled to the base between the first end and the second end of the hook arm.

13. The vehicle hook kit of clause 11 or 12, wherein the first interlock projection is configured to form the interlock with the base on a first side of the base and the second interlock projection is configured to form the interlock with the base on a second side of the base opposite the first side.

14. The vehicle hook kit of any of clauses 8-13, wherein a portion of the base is configured to extend between the hook arm and the interlock projection when the rotatable hook is rotated to the closed position.

15. A vehicle comprising: a storage space comprising a support structure; and a vehicle hook comprising: a base coupled to the support structure of the storage space; and a rotatable hook rotatively coupled to the base having an open position and a closed position and comprising: a hook arm; and an interlock projection extending from the hook arm, wherein the interlock projection forms an interlock with the base when the rotatable hook is rotated to the closed position and the interlock projection is angularly spaced from the base when the rotatable hook is rotated to the open position.

16. The vehicle of clause 15, wherein: the base of the vehicle hook defines a mounting surface coupled to the support structure of the trunk; and the base of the vehicle hook defines an axis of rotation of the rotatable hook that is perpendicular to the mounting surface.

17. The vehicle of clause 15 or 16, wherein the hook arm of the vehicle hook is spaced from the base when the rotatable hook is rotated to the closed position.

18. The vehicle of any of clauses 15-18, wherein the hook arm of the vehicle hook comprises a first end from which a first interlock projection extends and a second end from which a second interlock projection extends.

19. The vehicle of clause 18, wherein the rotatable hook of the vehicle hook is rotatively coupled to the base between the first end and the second end of the hook arm.

20. The vehicle of clause 18 or 19, wherein the first interlock projection is configured to form the interlock with the base on a first side of the base and the second interlock projection is configured to form the interlock with the base on a second side of the base opposite the first side.

21. A vehicle hook comprising: a base configured to be coupled to a support structure of a vehicle; and a rotatable hook rotatively coupled to the base having an open position and a closed position, the rotatable hook comprising a hook arm having an end, wherein the end of the hook arm is vertically aligned with the base when the rotatable hook is rotated to the closed position and the end of the hook arm is angularly spaced from the base when the rotatable hook is rotated to the open position.

22. The vehicle hook of clause 21, wherein: the base defines a mounting surface for mounting the base to the support structure of the vehicle; and the base defines an axis of rotation of the rotatable hook that is perpendicular to the mounting surface.

23. The vehicle hook of clause 21 or 22, wherein the hook arm is spaced from the base when the rotatable hook is rotated to the closed position providing a gap between the hook arm and the base.

24. The vehicle hook of any of clause 21-23, wherein the hook arm further comprises a first interlock projection that extends from a first end of the hook arm and a second interlock projection that extends from a second end.

25. The vehicle hook of clause 24, wherein the rotatable hook is rotatively coupled to the base between the first end and the second end of the hook arm.

26. The vehicle hook of clause 24, wherein the first interlock projection forms an interlock with the base on a first side of the base and the second interlock projection forms an interlock with the base on a second side of the base opposite the first side.

27. The vehicle hook of clause 21, wherein the hook arm further comprises an interlock projection that extends from the end of the hook arm, wherein a portion of the base extends between the hook arm and the interlock projection when the rotatable hook is rotated to the closed position.

It should now be understood that embodiments described herein are directed toward vehicle hooks that include a base and a rotatable hook rotatively coupled to the base. The rotatable hook includes an open position wherein an object can be mounted onto the rotatable hook and a closed position wherein an interlock projection is engaged with and supported by the base. By engaging the rotatable hook with the base, an object supported on the base may be better retained on the hook and additional weight may be supported by the vehicle hook as opposed to a vehicle hook without this engagement feature.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A vehicle hook comprising:
   a base having a mounting surface configured to be coupled to a support structure of a vehicle;
   a rotatable hook rotatively coupled to the base having an open position and a closed position, the rotatable hook comprising a hook arm having opposite ends and an axis of rotation that is perpendicular to an elongated length of the hook arm, wherein the opposite ends of the hook arm are vertically aligned with the base when the rotatable hook is rotated to the closed position and the opposite ends of the hook arm are angularly spaced from the base when the rotatable hook is rotated to the open position;
   one or more interlock projections extending from the hook arm, each interlock projection comprising an extending portion extending perpendicular from the hook arm and a locking tab projecting laterally from the extending portion; and one or more ports formed in a sidewall of the base, wherein the locking tab of an interlock projection is sized and arranged to be positioned within a port of the one or more ports when the rotatable hook is rotated to the closed position, wherein the base is located between the rotatable hook and the support structure when mounted to the support structure.

2. The vehicle hook of claim 1, wherein:
the axis of rotation of the rotatable hook is perpendicular to the mounting surface such that the rotatable hook rotates in a plane that is parallel to the mounting surface.

3. The vehicle hook of claim 1, wherein the hook arm is spaced from the base when the rotatable hook is rotated to the closed position providing a gap between the hook arm and the base.

4. The vehicle hook of claim 1, wherein the one or more interlock projections comprises a first interlock projection that extends from a first end of the hook arm and a second interlock projection that extends from a second end.

5. The vehicle hook of claim 4, wherein the rotatable hook is rotatively coupled to the base between the first end and the second end of the hook arm.

6. The vehicle hook of claim 4, wherein the first interlock projection forms an interlock with the base on a first side of the base and the second interlock projection forms another interlock with the base on a second side of the base opposite the first side.

7. The vehicle hook of claim 1, wherein a portion of the base extends between the hook arm and the interlock projection when the rotatable hook is rotated to the closed position.

8. A vehicle hook kit comprising:
a vehicle hook and an installation kit for installing the vehicle hook to a support structure of a vehicle, the vehicle hook comprising:
a base configured to be coupled to the support structure of the vehicle;
one or more ports formed in a sidewall of the base; and
a rotatable hook configured to be rotatively coupled to the base about an axis of rotation and having an open position and a closed position, the rotatable hook comprising:
a hook arm; and
one or more interlock projections extending from the hook arm parallel to the axis of rotation, each interlock projection comprising an extending portion extending perpendicular from the hook arm and a locking tab projecting laterally from the extending portion, the locking tab is sized and arranged to be positioned within a port of the one or more ports when the rotatable hook is rotated to the closed position,
wherein the interlock projection is configured to be angularly spaced from the base when the rotatable hook is rotated to the open position.

9. The vehicle hook kit of claim 8, wherein:
the base defines a mounting surface for mounting the base to the support structure of the vehicle; and
the axis of rotation is perpendicular to the mounting surface such that the rotatable hook rotates in a plane that is parallel to the mounting surface.

10. The vehicle hook kit of claim 8, wherein the hook arm is configured to be spaced from the base when the rotatable hook is rotated to the closed position.

11. The vehicle hook kit of claim 8, wherein the one or more interlock projections comprises a first end from which a first interlock projection extends and a second end from which a second interlock projection extends.

12. The vehicle hook kit of claim 11, wherein the rotatable hook is configured to be rotatively coupled to the base between the first end and the second end of the hook arm.

13. The vehicle hook kit of claim 11, wherein the first interlock projection is configured to form an interlock with the base on a first side of the base and the second interlock projection is configured to form another interlock with the base on a second side of the base opposite the first side when the rotatable hook is rotated to the closed position.

14. The vehicle hook kit of claim 8, wherein a portion of the base is configured to extend between the hook arm and the interlock projection when the rotatable hook is rotated to the closed position.

15. A vehicle comprising:
a storage space comprising a support structure; and
a vehicle hook comprising:
a base coupled to the support structure of the storage space;
one or more ports formed in a sidewall of the base; and
a rotatable hook rotatively coupled to the base about an axis of rotation and having an open position and a closed position and comprising:
a hook arm; and
one or more interlock projections extending from the hook arm parallel to the axis of rotation, each interlock projection comprising an extending portion extending perpendicular from the hook arm and a locking tab projecting laterally from the extending portion, wherein the locking tab is sized and arranged to be positioned within a port of the one or more ports when the rotatable hook is rotated to the closed position, and the interlock projection is angularly spaced from the base when the rotatable hook is rotated to the open position.

16. The vehicle of claim 15, wherein:
the base of the vehicle hook defines a mounting surface coupled to the support structure of the storage space; and
the axis of rotation is perpendicular to the mounting surface such that the rotatable hook rotates in a plane that is parallel to the mounting surface.

17. The vehicle of claim 15, wherein the hook arm of the vehicle hook is spaced from the base when the rotatable hook is rotated to the closed position.

18. The vehicle of claim 15, wherein the one or more interlock projections comprises a first end from which a first interlock projection extends and a second end from which a second interlock projection extends.

19. The vehicle of claim 18, wherein the rotatable hook of the vehicle hook is rotatively coupled to the base between the first end and the second end of the hook arm.

20. The vehicle of claim 18, wherein the first interlock projection is configured to form an interlock with the base on a first side of the base and the second interlock projection is configured to form another interlock with the base on a second side of the base opposite the first side.

* * * * *